(12) United States Patent
Babin et al.

(10) Patent No.: US 7,175,420 B2
(45) Date of Patent: Feb. 13, 2007

(54) VALVE GATED INJECTION MOLDING SYSTEM WITH INDEPENDENT FLOW CONTROL

(75) Inventors: Denis Babin, Georgetown (CA); George Olaru, Toronto (CA)

(73) Assignee: Mold-Masters Limited, Georgetown (CA)

( * ) Notice: Subject to any disclaimer, the term of this patent is extended or adjusted under 35 U.S.C. 154(b) by 390 days.

(21) Appl. No.: 10/777,643

(22) Filed: Feb. 13, 2004

(65) Prior Publication Data

US 2004/0161490 A1 Aug. 19, 2004

Related U.S. Application Data

(60) Provisional application No. 60/446,997, filed on Feb. 13, 2003.

(51) Int. Cl.
*B29C 45/23* (2006.01)
(52) U.S. Cl. ............... 425/564; 425/566; 425/570; 425/572
(58) Field of Classification Search ............... 425/562, 425/563, 564, 565, 566, 570, 572
See application file for complete search history.

(56) References Cited

U.S. PATENT DOCUMENTS

| | | | |
|---|---|---|---|
| 3,374,502 A | 3/1968 | Lazzara | |
| 3,390,433 A | 7/1968 | Barnett et al. | |
| 3,417,433 A | 12/1968 | Teraoka | |
| 3,807,914 A | 4/1974 | Paulson et al. | |
| 3,819,313 A | 6/1974 | Josephsen et al. | |
| 3,861,841 A | 1/1975 | Hanning | |
| 4,279,582 A | 7/1981 | Osuna-Diaz | |

(Continued)

FOREIGN PATENT DOCUMENTS

CN 2527427 Y 12/2002

(Continued)

OTHER PUBLICATIONS

"The 5 Step Process—The 5 Step Process is fast becoming an industry standard method for diagnosing and isolating cavity variations in multi-cavity injection molds." Beaumont Technologies, Inc. http://www.meltflipper.com/fivestep/fivestep/html, dated Mar. 14, 2004.

(Continued)

*Primary Examiner*—Tim Heitbrink
(74) *Attorney, Agent, or Firm*—Medler Ferro PLLC

(57) ABSTRACT

An injection molding system includes a manifold and a valve gated hot runner nozzle. The gating mechanism includes an actuated valve pin, where the mold gate orifice is open when the valve pin is in a first position to allow melt to flow there through. The mold gate orifice is closed when the valve pin is in a second position to prevent melt from flowing there though. A flow control pin is disposed within the melt stream, either coaxially with the valve pin within the melt channel of the nozzle or within the manifold melt channel. The flow control pin has a head with a complementary geometry with that of the melt channel at a flow control surface. The flow control pin is raised and lowered by an actuation mechanism to constrict or release the flow of the melt stream independent from the movement of the valve pin.

24 Claims, 14 Drawing Sheets

U.S. PATENT DOCUMENTS

| | | | |
|---|---|---|---|
| 4,380,426 A | 4/1983 | Wiles | |
| 4,420,452 A | 12/1983 | van Dalen et al. | |
| 4,657,496 A | 4/1987 | Ozeki et al. | |
| 4,717,324 A | 1/1988 | Schad et al. | |
| 4,723,898 A | 2/1988 | Tsutsumi | |
| 4,863,369 A | 9/1989 | Schad et al. | |
| 5,028,226 A | 7/1991 | De'ath et al. | |
| 5,043,129 A | 8/1991 | Sorensen | |
| 5,112,212 A | 5/1992 | Akselrud et al. | |
| 5,141,696 A | 8/1992 | Osuna-Diaz | |
| 5,143,733 A | 9/1992 | Von Buren et al. | |
| 5,149,547 A | 9/1992 | Gill | |
| 5,192,555 A | 3/1993 | Arnott | |
| 5,200,207 A | 4/1993 | Akselrud et al. | |
| 5,200,527 A | 4/1993 | Griffiths et al. | |
| 5,223,275 A | 6/1993 | Gellert | |
| 5,238,378 A | 8/1993 | Gellert | |
| 5,260,012 A | 11/1993 | Arnott | |
| 5,299,928 A | 4/1994 | Gellert | |
| 5,389,315 A | 2/1995 | Yabushita | |
| 5,454,995 A | 10/1995 | Rusconi et al. | |
| 5,478,520 A | 12/1995 | Kasai et al. | |
| 5,556,582 A | 9/1996 | Kazmer | |
| 5,582,851 A | 12/1996 | Hofstetter et al. | |
| 5,605,707 A | 2/1997 | Ibar | |
| 5,650,178 A | 7/1997 | Bemis et al. | |
| 5,762,855 A | 6/1998 | Betters et al. | |
| 5,766,654 A | 6/1998 | Groleau | |
| 5,773,038 A | 6/1998 | Hettinga | |
| 5,814,358 A | 9/1998 | Bock | |
| 5,849,236 A | 12/1998 | Tatham | |
| 5,891,381 A | 4/1999 | Bemis et al. | |
| 5,894,023 A | 4/1999 | Schramm et al. | |
| 5,919,492 A | 7/1999 | Tarr et al. | |
| 5,935,614 A | 8/1999 | Blank et al. | |
| 6,045,740 A | 4/2000 | Gorlich | |
| 6,062,840 A | 5/2000 | Lee et al. | |
| 6,090,318 A | 7/2000 | Bader | |
| 6,099,767 A | 8/2000 | Tarr et al. | |
| 6,228,309 B1 | 5/2001 | Jones et al. | |
| 6,245,278 B1 | 6/2001 | Lausenhammer et al. | |
| 6,254,377 B1 | 7/2001 | Kazmer et al. | |
| 6,261,075 B1 | 7/2001 | Lee et al. | |
| 6,287,107 B1 | 9/2001 | Kazmer et al. | |
| 6,294,122 B1 | 9/2001 | Moss et al. | |
| 6,309,208 B1 | 10/2001 | Kazmer et al. | |
| 6,343,921 B1 | 2/2002 | Kazmer et al. | |
| 6,343,922 B1 | 2/2002 | Kazmer et al. | |
| 6,361,300 B1 | 3/2002 | Kazmer et al. | |
| 6,464,909 B1 * | 10/2002 | Kazmer et al. | 425/564 |
| 6,558,603 B2 | 5/2003 | Wobbe et al. | |
| 6,679,697 B2 | 1/2004 | Bouti | |
| 6,683,283 B2 | 1/2004 | Schmidt | |
| 6,699,422 B1 | 3/2004 | Stemke | |
| 6,903,750 B2 | 6/2005 | Sidwell | |
| 2002/0121713 A1 | 9/2002 | Moss et al. | |
| 2003/0170340 A1 | 9/2003 | Sicilia et al. | |
| 2003/0224086 A1 | 12/2003 | Olaru | |
| 2004/0071817 A1 | 4/2004 | Fischer et al. | |
| 2004/0109916 A1 | 6/2004 | Babin | |
| 2005/0079242 A1 | 4/2005 | Schmidt | |

FOREIGN PATENT DOCUMENTS

| | | |
|---|---|---|
| DE | 198 02 048 A1 | 7/1999 |
| EP | 0 393 389 B1 | 10/1990 |
| EP | 0 624 449 A2 | 11/1994 |
| EP | 0 901 896 A2 | 3/1999 |
| EP | 0 967 063 A1 | 12/1999 |
| EP | 1 013 395 A1 | 6/2000 |
| EP | 1 426 160 A1 | 6/2004 |
| EP | 1 447 200 A2 | 8/2004 |
| JP | 58-142833 | 8/1983 |
| JP | 60-212321 | 10/1985 |
| JP | 63-166511 | 7/1988 |
| JP | 4-348923 | 12/1992 |
| JP | 5-104580 | 4/1993 |
| JP | 6-8285 | 1/1994 |
| JP | 6-166072 | 6/1994 |
| JP | 7-40400 | 2/1995 |
| JP | 7-266379 | 10/1995 |
| JP | 9-1600 | 1/1997 |
| JP | 9-39033 | 2/1997 |
| JP | 9-141688 | 6/1997 |
| JP | 11-5232 | 1/1999 |
| WO | WO 98/56564 | 12/1998 |
| WO | WO 99/54109 | 10/1999 |
| WO | WO 00/35655 | 6/2000 |
| WO | WO 01/21377 | 3/2001 |
| WO | WO 01/36174 | 5/2001 |
| WO | WO 01/60580 | 8/2001 |
| WO | WO 02/36324 | 5/2002 |
| WO | WO 03/057448 A1 | 7/2003 |

OTHER PUBLICATIONS

Ewikon Hotrunner systems for large parts, Product Brochure, www.ewikon.com, May 2000.

Cavity pressure and temperature sensor 6190A, Product Brochure "Sensors and Data Acquisition For Injection Molding Cavity Pressure and Temperature Sensor and Dataflow", Kistler Japan Co., Ltd http://www.a-tex.co.jp/plastics/data/243.pdf, 2003.

Knights, Mikell, "Micromolding Sizing Up the Challenges", *Plastics Technology* http://www.plasticstechnology.com/articles/200104fa1.html, Apr. 2001.

SG-Link™ Wireless Strain Gauge System, Product Brochure, http://www.microstrain.com/SG-link.htm, MicroStrain®.

Nunnery, Len, "Tooling Innovations for Thermoset Molding", Bulk Molding Compounds, Inc. http://www.bulkmolding.com/technical_papers/tooling_thermosetmolding.pdf, 2003.

"Pressure and Temperature Control of Multicavity Injection Mold with Hydraulic Valve Gate Hot Mold System," No. 301, p. 333, Research Disclosure, Kenneth Mason Publications, Hampshire, GB, May 1989, XP 000052496, ISSN: 0374-4353.

* cited by examiner

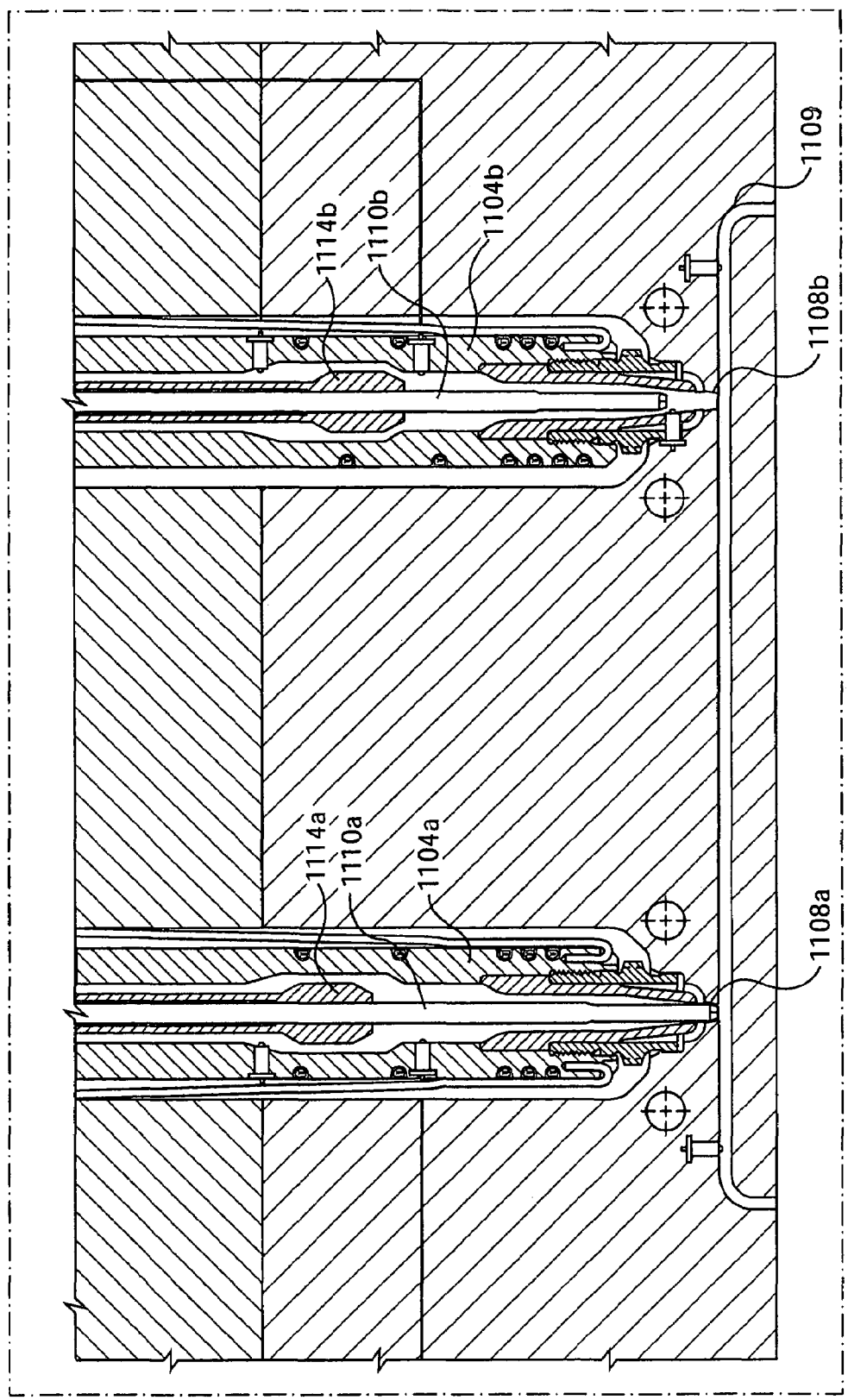

VALVE GATED INJECTION MOLDING SYSTEM WITH INDEPENDENT FLOW CONTROL

CROSS-REFERENCE TO RELATED APPLICATIONS

This application claims the benefit of provisional application 60/446,997, filed Feb. 13, 2003, which is hereby incorporated by reference in its entirety.

BACKGROUND OF THE INVENTION

1. Field of the Invention

The present invention relates generally to injection molding technology, and more particularly to the dynamic control of the amount of plastic injected per injection cycle.

2. Background of the Invention

Injection molding of plastic parts is a common manufacturing practice. Various articles of commercial value such as plastic bottles, toothbrushes, and children's toys, are made using well-known injection molding techniques. Injection molding generally involves melting plastic then forcing the melt stream at high temperatures and pressures through one or more gates into a mold cavity. The melt cools in the shape of the mold cavity, which is opened to eject the finished part.

A valve gated injection molding apparatus is well known, as shown and described in U.S. Pat. No. 4,380,426 to Gellert, incorporated herein in its entirety by reference thereto. Usually a valve pin has a cylindrical or tapered front end and reciprocates between a retracted open position and a forward closed position in which the front end is seated in a gate. In some applications, the valve pin functions in the reverse direction and closes in the retracted position.

Valve-gated mechanisms are, however, typically designed to open and close the gates in a binary fashion, i.e., the gate is either opened or it is closed without allowing for a partially opened scenario in which the melt flow rate or amount is controlled through the gate. In some manufacturing processes, the ability to control the melt stream during the shot is highly desirable. For example in a multi-gated system in which a single mold cavity is fed melt through multiple gates, a common manifold serves all of the gates. However, a "knit line" is formed at the interface where melt flowing from one gate meets melt flowing from another gate. Even though all of the gates are commonly fed, the ability to control the flow rate through each gate individually allows the designer to control the location of the knit line for structural or aesthetic purposes.

Another instance in which control over the melt stream flow is desirable is when a number of parts are simultaneously molded. Each mold cavity is fed melt by an individual gate. However, the mold cavities are not necessarily all the same size, such as when components of an interlocking piece are simultaneously molded, as in the sections of a cellular telephone casing or the base and cover of a packaging system. The common melt stream is important so that the plastic characteristics are as uniform as possible between the mold cavities; however, as the mold cavities are not of a uniform size, one mold cavity customarily takes longer to fill than the other(s). However, if the larger mold cavity is filled more quickly, then both molded parts would be ready for ejection from its respective mold cavity at the same time.

Various methods exist in the art to provide this type of control over the melt stream. The gates could be individually re-tooled for every new product, but this is expensive and time-consuming. U.S. Pat. No. 5,556,582 to Kazmer et al., incorporated herein in its entirety by reference thereto, describes a system wherein multiple adjustable valve pins are located each in its respective gate within a manifold, wherein each gate is fluidly connected to a common mold cavity. Each valve pin can be dynamically adjusted by a computer according to pressure data read at or near the injection point into the mold. Each valve pin has a tapered head and each melt channel has a complementary geometry, such that the melt stream is slowed to an eventual full stop.

Another system is described in U.S. Patent Application Publication No. 2002/0121713 to Moss et al., incorporated herein in its entirety by reference thereto. In this publication, a valve pin is located in the manifold, with a tapered valve pin head disposed at the inlet point to a hot runner nozzle. The melt channel at the inlet point has a corresponding geometry to the tapered pin head, such that when the pin head is pushed into the inlet, the melt stream slows to an eventual stop.

Yet another system is described in WIPO PCT publication WO 01/21377 to Kazmer et al., incorporated herein in its entirety by reference thereto. In this publication, the manifold includes "shooting pot" technology. A portion of the melt stream is diverted from the manifold melt channel into a separate compartment or "well". Disposed within this well is an actuated ram, which can be positioned to seal the opening of the well. A nozzle is located downstream of the well. The flow of melt through a mold gate orifice is controlled by an actuated valve pin. When the melt stream is introduced into the manifold melt channel, the valve pin is seated within the mold gate orifice to prevent flow into a mold cavity. The ram is located in a retracted position so that a volume of melt from the melt stream may be diverted into the well and contained therein. To start the shot, a gating mechanism located upstream from the well closes the melt channel, thereby preventing the introduction of new melt into the well. The valve pin is unseated from the mold gate orifice, and the ram is moved forward at a first velocity to force melt into the mold cavity. A system of pressure sensors measures the pressure in the system and compares that pressure reading to a target pressure profile. If greater pressure is required, the ram velocity is increased. Alternatively, if lesser pressure is required, the ram velocity is slowed. When the ram reaches its lowermost position, the mold cavity is full, and the mold gate orifice is closed. Through this manipulation of the ram velocity, the flow rate of the melt stream can be controlled. This control over the melt stream requires completely closing off one portion of the melt channel in order to manipulate the melt stream in another portion thereof.

However, none of these systems provides the ability to control the melt stream such that the flow rate and amount are controlled separately from the traditional gating shut-off functions without causing a secondary interruption of the melt stream. A simplified mechanism to achieve a finer gradation of control over the flow of melt can improve the efficiency of the system, saving the manufacturer time and money.

SUMMARY OF THE INVENTION

The present invention is an injection molding apparatus including an injection molding manifold having a plurality of melt channels that are in communication with a plurality of hot runner nozzles. Each hot runner nozzle has a melt channel and communicates with a mold cavity or a portion of a mold cavity via a mold gate. A movable valve pin is used in cooperation with each nozzle to either permit or prevent the transfer of a molten material from the nozzle melt channel into the mold cavity. The valve pins further function to regulate the amount of molten material entering each mold cavity. An additional flow control pin is used to independently regulate the amount of molten material injected into each mold cavity when the valve pin is in the open position. The flow control pin is located in the melt channel of either the nozzle or the manifold. Injection molding processing sensors such as thermocouples and pressure sensors are placed along the manifold melt channels, the nozzle melt channels and/or in the mold cavity to provide temperature, viscosity and/or pressure information to a mold controller linked to the actuation mechanisms of the valve pins and the flow control pins. The position of the flow control pin is adjusted before or during the injection molding process based on processing data gathered by the processing sensors.

In one embodiment, of the present invention, each mold cavity is fluidly connected to only one hot runner nozzle wherein each mold cavity has substantially the same size and shape. In another embodiment, each mold cavity is fluidly connected to one hot runner nozzle wherein each mold cavity is not of the same size and shape. In yet another embodiment, several nozzles are fluidly connected to the same mold cavity via separate mold gates. In each of these embodiments, there is a need to control independently the amount of melt fed through each nozzle and through each mold gate to produce better molded parts in terms of weight and/or knit lines.

Accordingly, disclosed herein is an injection molding system wherein multiple levels of control can be attained over the melt stream. In an embodiment, a valve-gated nozzle is fed melt from a manifold. The gating mechanism includes an actuated valve pin, where the mold gate orifice is open when the valve pin is in a first position to allow melt to flow there through. The mold gate orifice is closed when the valve pin is in a second position to prevent melt from flowing there through. In addition, a flow control pin is disposed coaxially with the valve pin within the melt channel of the nozzle. The flow control pin has a head with a complementary geometry with that of the melt channel. The flow control pin is raised and lowered by an actuation mechanism to constrict or release the flow of the melt stream. The movement of the flow control pin could be pre-programmed or could be dynamically triggered using pressure and temperature sensors at or near the nozzle. The valve pin and the flow control pin are independently actuated.

In another embodiment of the present invention, a valve-gated nozzle is fed melt from a manifold. The mold gate orifice includes an actuated valve pin, where the mold gate orifice is open when the valve pin is in a first position to allow melt to flow there through. The mold gate orifice is closed when the valve pin is in a second position to prevent melt from flowing there through. A flow control pin is located in the manifold melt channel, offset from the melt channel of the nozzle. The flow control pin has a head with a complementary geometry with that of the manifold melt channel. The flow control pin is raised and lowered by an actuation mechanism to constrict or release the flow of the melt stream. The movement of the flow control pin could be pre-programmed or could be dynamically triggered using pressure and temperature sensors at or near the nozzle. The valve pin and the flow control pin are independently actuated.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 11B shows an enlarged view of the nozzles of the injection molding system according to the first embodiment of the present invention in a first application, where the nozzles are in a second configuration.

DETAILED DESCRIPTION OF THE INVENTION

Specific embodiments of the present invention are now described with reference to the figures, where like reference numbers indicate identical or functionally similar elements.

Figure 1:
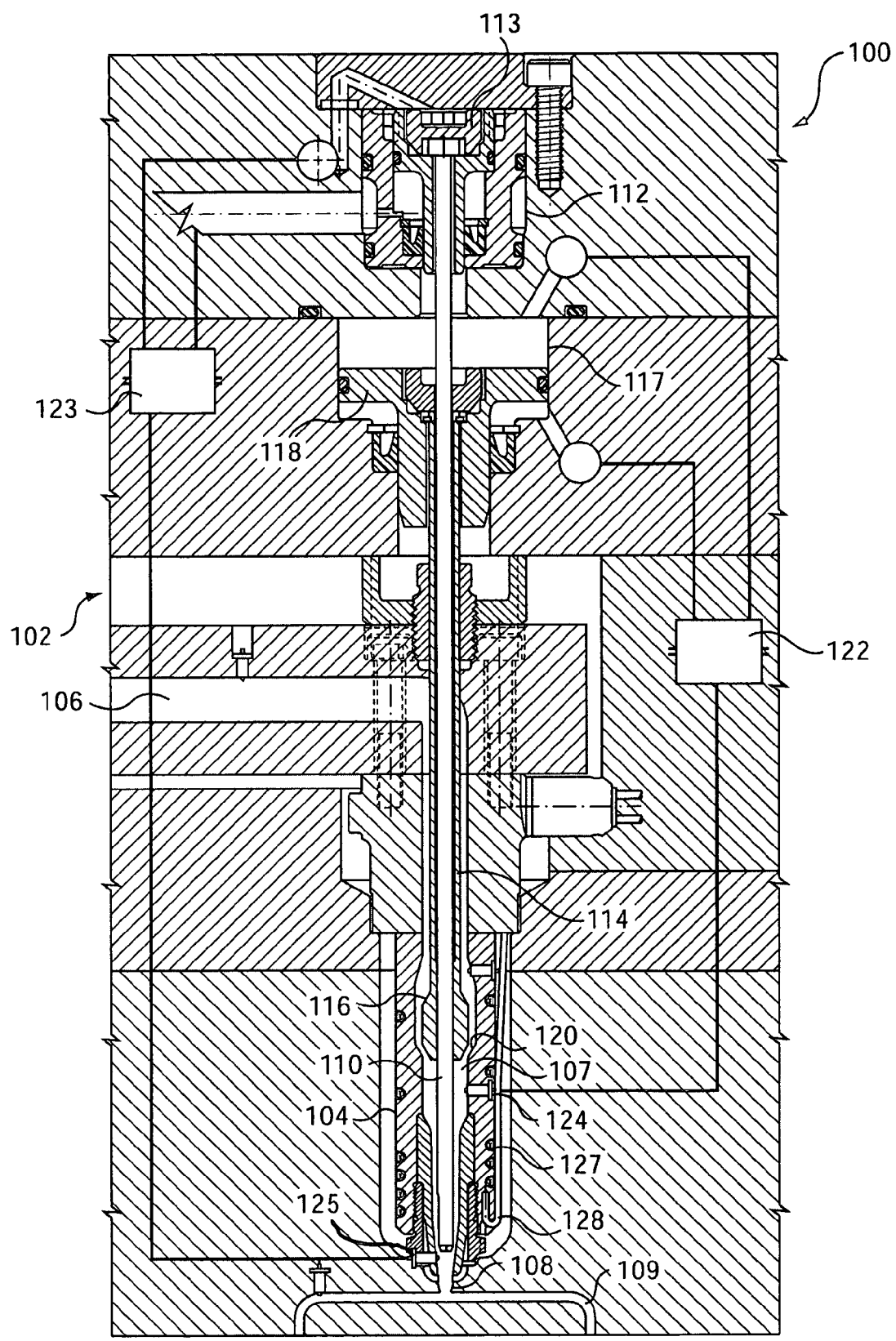
FIG. 1 shows a sectional schematic view of an injection molding system according to a first embodiment of the present invention, where the flow is constrained and the mold gate orifice is open.

Referring now to FIG. 1, a first embodiment of the invention is described. An injection molding system 100 includes a manifold 102 and a plurality of nozzles, such as nozzle 104. Nozzle 104 is a valve-gated hot runner nozzle, with a heater 127 and a thermocouple 128.

A manifold melt channel 106 is disposed within manifold 102 and conveys melt to a plurality of nozzle channels, such as for example nozzle melt channel 107, which further conveys the melt through a gate 108 into mold cavity 109. In this embodiment, there are several mold cavities, such as for example mold cavity 109, of equal or almost equal size and shape in communication with several nozzles (not shown), such as nozzle 104. Each cavity has a single mold gate 108. The present invention allows multiple cavities of equal size to be filled in the same cycle or time period by "balancing" the melt flow through manifold 102, as will be explained in further detail below.

Figure 3:
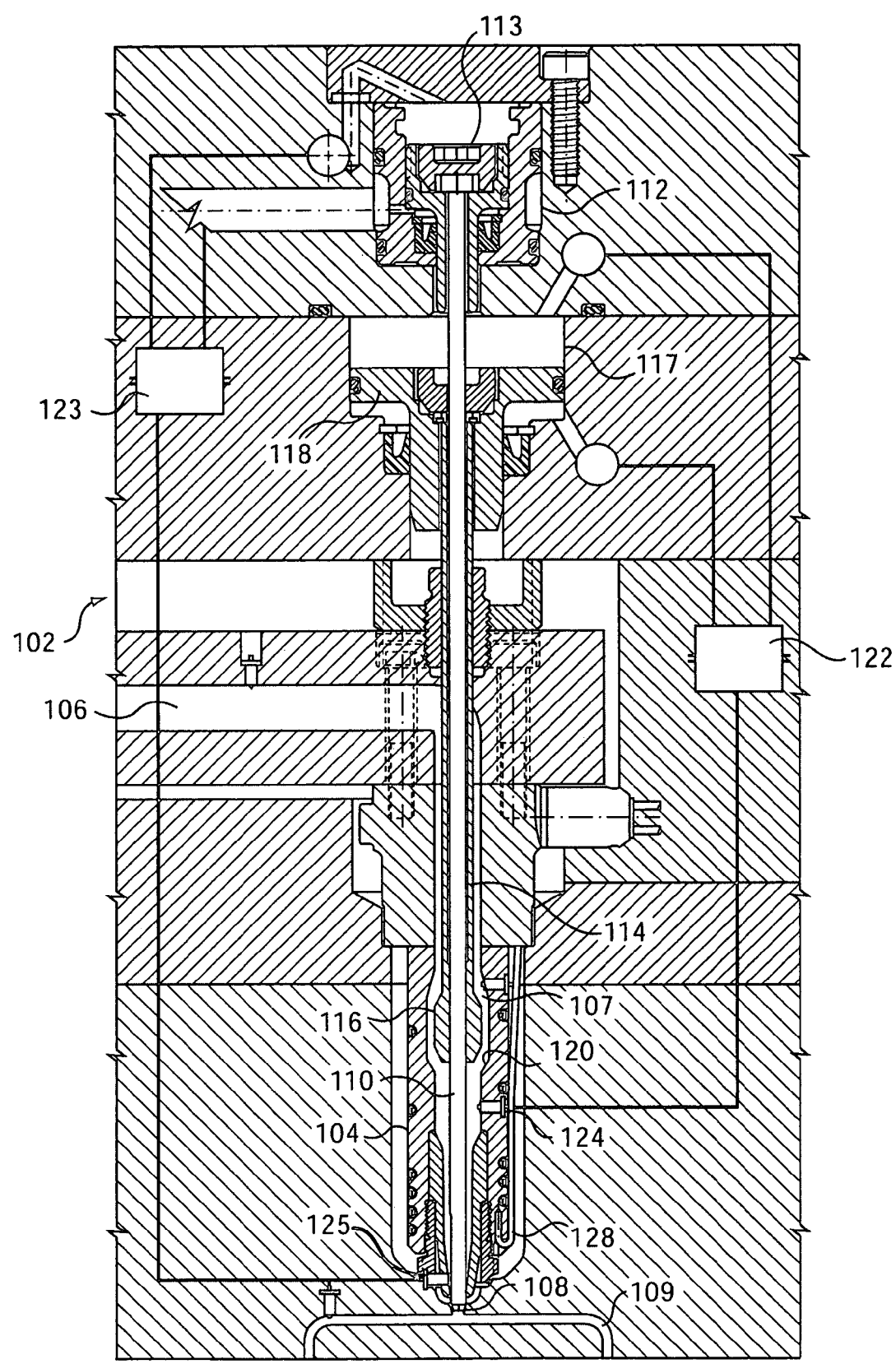
FIG. 3 shows a sectional schematic view of an injection molding system according to a first embodiment of the present invention, where the flow is not constrained and the mold gate orifice is closed.
Figure 4:
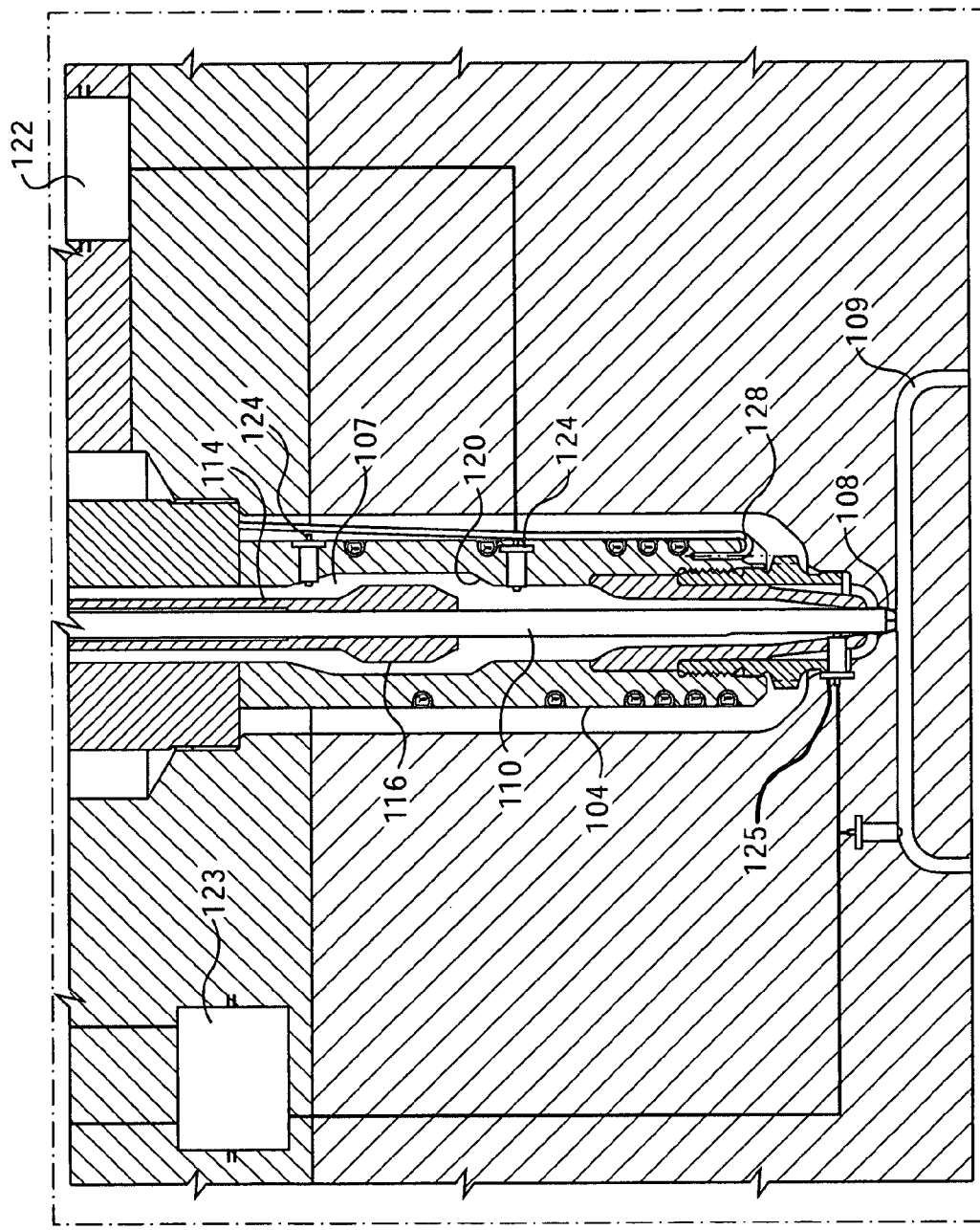
FIG. 4 shows an enlarged view of the nozzle of FIG. 3.

As gate 108 is a valve gate, the front portion of a valve pin 110 is disposed within nozzle melt channel 107. Valve pin 110 extends through a portion of manifold melt channel 106 to a valve pin actuation mechanism 112, which is disposed longitudinally above manifold 102. Gate 108 allows the flow of melt into mold cavity 109. In a first position, valve pin 110 is retracted from gate 108 by operation of valve pin actuation mechanism 112 to allow melt to flow through gate 108 into mold cavity 109. In a second position, shown in FIGS. 3 and 4, valve pin 110 is seated within gate 108 by operation of valve pin actuation mechanism 112 to prevent the flow of melt into mold cavity 109.

Valve pin actuation mechanism 112 includes a piston 113 driven by any of the various actuation driving mechanisms known in the art, including but not limited to pneumatic, hydraulic, or cam and lever devices. A pneumatic driving system operates by linking an external air source to the piston driving mechanism with valves controlled by a timing circuit which applies and releases the pressure in a repetitive timed sequence in conjunction with the application of pressure to the melt from the molding system. A hydraulic driving system operates in the same manner as the pneumatic system, only hydraulic fluid is substituted for air.

In an alternate embodiment, a bladder piston, as shown and described in the co-pending U.S. Appl. No. 60/363,891 filed on Mar. 14, 2002 by the same assignee which is incorporated herein in its entirety by reference thereto, may be used. A bladder piston is an expandable and elongated bag which shortens in length when filled with a pressurized fluid like air, water, or oil. One end of the bladder is affixed to a valve pin such that, as the bladder is pressurized, it contracts in length and the valve pin is unseated from the mold gate orifice, which allows the melt to flow into the mold cavity. Similarly, depressurizing the bladder causes the bladder to increase in length, which seats the valve pin in the mold gate orifice and stops the flow of the melt into the mold cavity.

Valve pin actuation mechanism 112 can be controlled in a variety of ways. Preferably, one or more pressure transducers 125 are linked to servo valve 123. Servo valve 123 is linked to the driving mechanism (not shown). When the pressure inside the system, as measured by pressure transducers 125, reaches a first level, servo valve 123 switches so that fluid or air from the driving mechanism can flow to valve pin actuation mechanism 112, causing piston 113 to move valve pin 110 within gate 108. When pressure in the system is measured by pressure transducers 125 to be a second level, servo valve 123 switches so that fluid or air from the driving mechanism is shut off, causing piston 113 to retract valve pin 110 from gate 108.

Alternatively, valve pin actuation mechanism 112 may be controlled by mechanisms other than servo valve 123. For example, in one embodiment, valve pin actuation mechanism 112 may be controlled by a computer that follows a pre-determined cycle. The computer signals circuitry connected to the driving mechanism according to the cycle, and the circuitry then triggers the driving mechanism, and piston 113 is driven up or down. Accordingly, rather than controlling valve pin 110 by servo valve 123 movement based on pressure readings, the computer controlled arrangement is based on the timing of each cycle.

Disposed within nozzle melt channel 107 is a flow control pin 114. As with valve pin 110, flow control pin 114 extends through a portion of manifold melt channel 106 to a flow control pin actuation mechanism 117. Flow control pin actuation mechanism 117 is located between manifold 102 and valve pin actuation mechanism 112, although the relative position of actuation mechanisms 112, 117 could easily be reversed. Flow control pin 114 is in one embodiment a sleeve which coaxially surrounds valve pin 110, as shown in FIG. 1, although pins 110 and 114 could also simply run parallel to one another within a larger diameter nozzle melt channel 107.

Flow control pin 114 enables control of the amount of melt passing through nozzle 104 independent of the functioning of valve pin 110. To achieve this purpose, flow control pin 114 includes a flow control surface 116, a head disposed at the terminal end of flow control pin 114 within nozzle 104. In the embodiment of FIG. 1, flow control surface 116 has a larger diameter than that of the shaft of flow control pin 114, and the distal end of flow control surface 116 has a tapered geometry. Nozzle melt channel 107 has a complementary geometry at a flow control surface 120.

Figure 2:
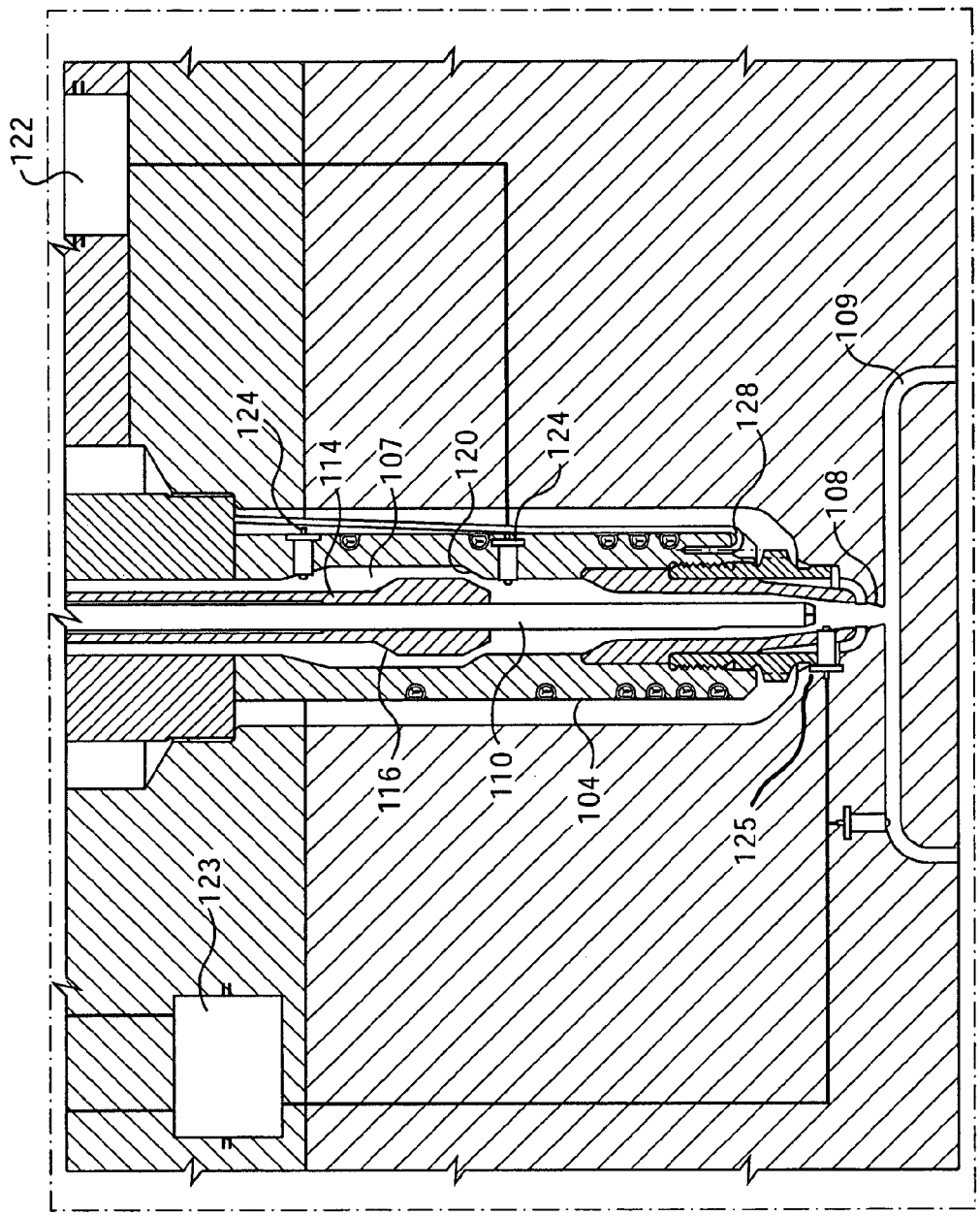
FIG. 2 shows an enlarged view of the nozzle of FIG. 1.

In a first position, shown in FIGS. 1 and 2, flow control surface 116 is positioned at or near flow control surface 120. Due to the complementary geometry of surface 116 and nozzle melt channel 107 at surface 120, surface 116 constricts the flow of melt through nozzle melt channel 107 to decrease the volume of melt thereby decreasing the flow of material to gate 108. In a second position, shown in FIGS. 3 and 4, flow control surface 116 is positioned away from flow control surface 120 so that the flow of melt through nozzle melt channel 107 is not constricted. Intermediate positioning of flow control surface 116, where the flow of melt through nozzle melt channel 107 is only partly constricted, is also possible.

Flow control pin actuation mechanism 117, like valve pin actuation mechanism 112, is a piston 118 driven by any of the actuation driving mechanisms known in the art, such as pneumatic, hydraulic, cam and lever devices, or bladder pistons. Flow control actuation mechanism 117 is controlled as described above with respect to valve pin actuation mechanism 112. Flow control actuation mechanism 117 can be controlled in a variety of ways. Preferably, one or more pressure transducers 124 are linked to servo valve 122. Servo valve 122 is linked to the driving mechanism (not shown). When the pressure inside the system, as measured by pressure transducers 124, reaches a first level, servo valve 122 switches so that fluid or air from the driving mechanism can flow to flow control actuation mechanism 117, causing piston 118 to move flow control pin 110 towards flow control surface 120. When pressure in the system is measured by pressure transducers 124 to be a second level, servo valve 122 switches so that fluid or air from the driving mechanism is shut off, causing piston 118 to retract flow control pin 114 away from flow control surface 120.

Alternatively, flow control actuation mechanism 117 may be controlled by mechanisms other than servo valve 122. For example, in one embodiment, flow control actuation mechanism 117 may be controlled by a computer that follows a pre-determined cycle. The computer signals circuitry connected to the driving mechanism according to the cycle, and the circuitry then triggers the driving mechanism, and piston 118 is driven up or down. Accordingly, rather than controlling flow control pin 114 by servo valve 122 movement based on pressure readings, the computer controlled arrangement is based on the timing of each cycle.

In addition to pressure information controlling flow control pin 114, in another embodiment of the present invention temperature information may also be used to control flow control pin 114 and therefore adjust the position of flow control pin 114. Further, in addition to thermocouple 128, injection molding system 100 may include additional temperature sensors (not shown) to help control of melt flow.

The geometry of nozzle melt channel 107 is shown in FIGS. 1 and 2 to have a slightly larger diameter in the region of flow control surface 116, i.e., the nozzle melt channel expands and then tapers back to the original diameter at a lower end of flow control surface 120. This geometry allows flow control surface 116, which has a larger diameter than the rest of flow control pin 114, to move freely within nozzle melt channel 107. However, many different geometries are contemplated by the present invention. For example, the nozzle melt channel 107 may have a first diameter which is greater than the diameter of the flow control surface 116 which tapers at flow control surface 120 to a second diameter.

Figure 5:
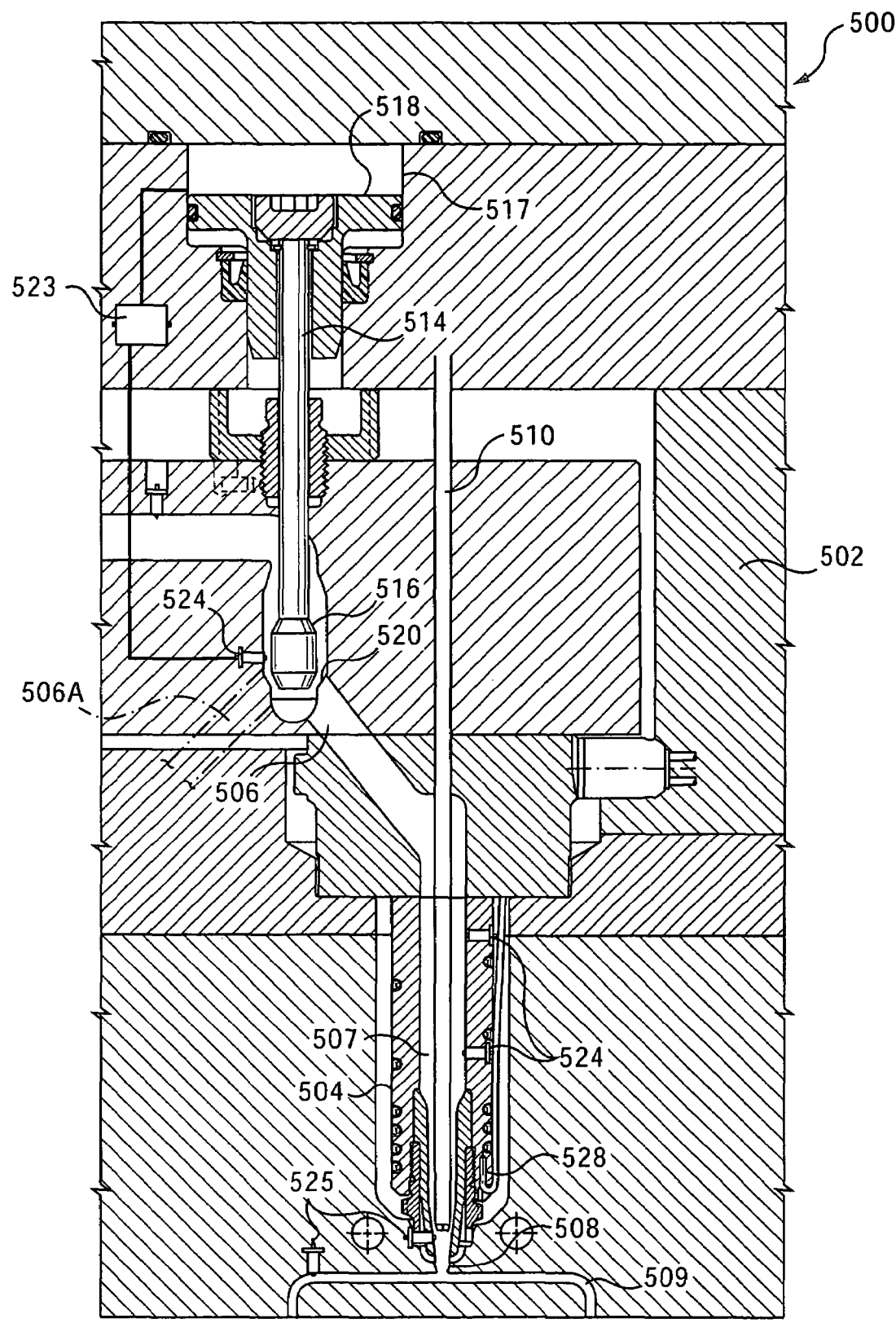
FIG. 5 shows a sectional schematic view of an injection molding system according to a second embodiment of the present invention, where the flow is constrained and the mold gate orifice is open.
Figure 6:
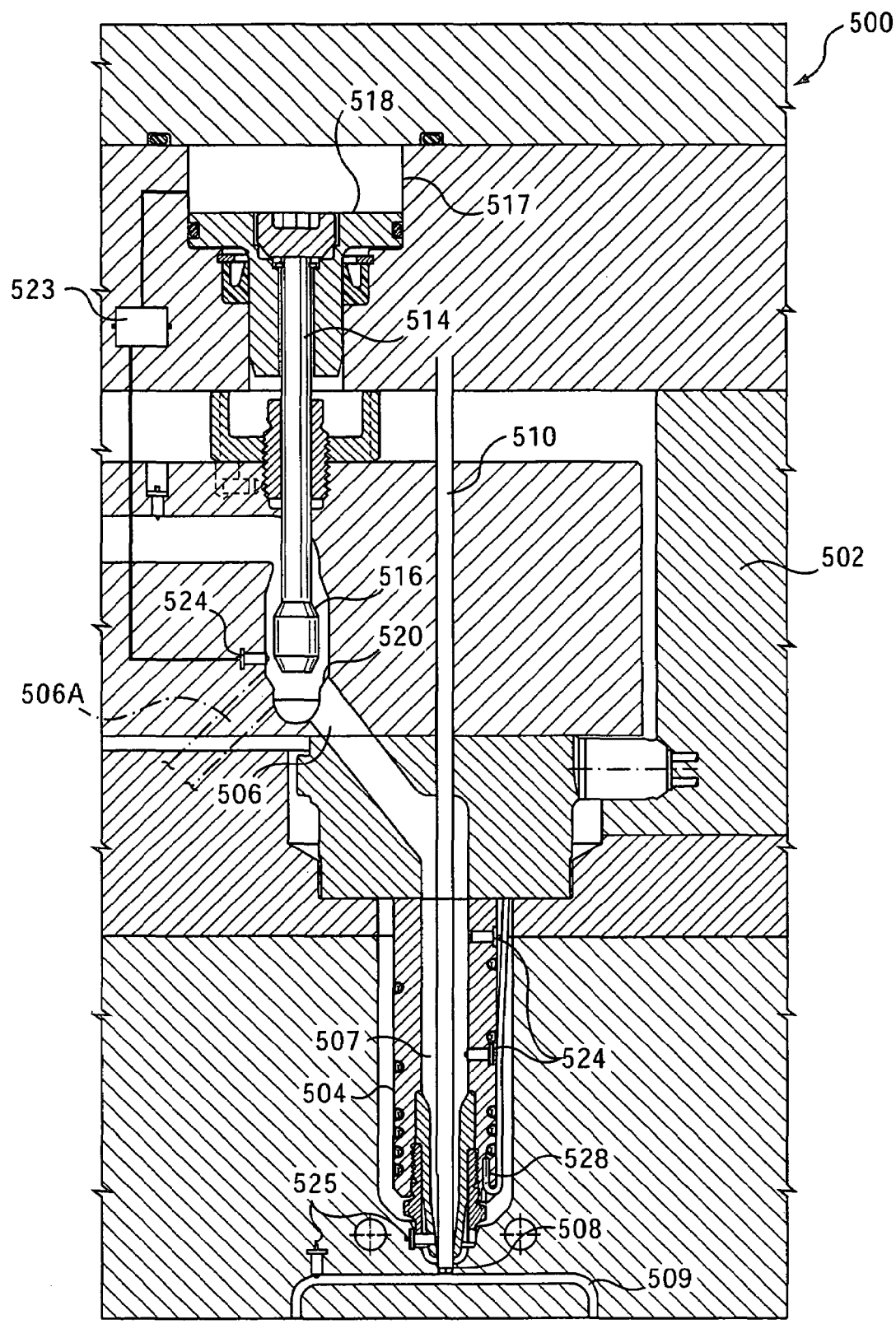
FIG. 6 shows a sectional schematic view of an injection molding system according to the second embodiment of the present invention, where the flow is not constrained and the mold gate orifice is closed.

Referring now to FIGS. 5–6, a second embodiment of the present invention is shown. Injection molding system 500 includes a manifold 502 and a nozzle 504. Nozzle 504 is a valve-gated hot runner nozzle. Injection molding system 500 further includes a thermocouple 528.

A manifold melt channel 506 is disposed within manifold 502 and conveys melt to a nozzle melt channel 507, which further conveys the melt through gate 508 into mold cavity 509.

The shaft of a valve pin 510 extends through a portion of manifold melt channel 506 to a valve pin actuation mechanism (not shown), which is disposed longitudinally above manifold 502. Gate 508 controls the flow of melt into mold cavity 509. In a first position, valve pin 510 is unseated from gate 508 by operation of the valve pin actuation mechanism to allow melt to flow through gate 508 into mold cavity 509. In a second position, shown in FIG. 6, valve pin 510 is seated within gate 508 by operation of the valve pin actuation mechanism to prevent the flow of melt into mold cavity 509.

The actuation of valve pin 510 and the functioning, variations, and control of the valve pin actuation mechanism may be any of the systems as described above with respect to the first embodiment, for example utilizing a transducer 524 and a servo valve 523.

Disposed within manifold melt channel 506 is a flow control pin 514. The shaft of flow control pin 514 extends through a portion of manifold melt channel 506 to a flow control pin actuation mechanism 517. Flow control actuation mechanism 517 is located between manifold 102 and the valve pin actuation mechanism (not shown), although their relative positions could easily be reversed.

Flow control pin 514 enables control of the flow of melt passing through nozzle 504 independent of the functioning of valve pin 510. To achieve this purpose, flow control pin 514 includes a flow control surface 516, a head disposed at the terminal end of flow control pin 514 within manifold 502. Flow control surface 516 has a larger diameter than that of the shaft of flow control pin 514, and the distal end of flow control surface 516 has a tapered geometry. Manifold melt channel 507 has a complementary geometry at a flow control surface 520.

In a first position, shown in FIG. 5, flow control surface 516 is positioned at or near flow control surface 520. Due to the complementary geometry of surface 516 and manifold melt channel 506 at surface 520, surface 516 constricts the flow of melt through manifold melt channel 507. In a second position, shown in FIG. 6, flow control surface 516 is positioned away from flow control surface 520 so that the flow of melt through manifold melt channel 506 is not constricted. Intermediate positioning of flow control surface 516, where the flow of melt through manifold melt channel 506 is only partially constricted, is also possible.

As shown in FIG. 5, manifold melt channel 506 leads away from flow control surface 520 at an angle. This offset configuration allows for an optional second manifold melt channel 506A to be added to the system so that a second nozzle (504) may be flow controlled simultaneously with nozzle 504. However, the present invention is not limited to this geometry, and nozzle melt channel 507 may be disposed in a collinear arrangement with manifold melt channel 506. With this arrangement, flow control pin 514 would have the sleeve-like configuration as described above with respect to the first embodiment.

As described above with respect to the first embodiment, flow control pin actuation mechanism 517, is a piston 518 driven by any of the actuation driving mechanisms known in the art, such as pneumatic, hydraulic, cam and lever devices, or bladder pistons. Flow control actuation mechanism 517 is controlled as described above with respect to the first embodiment.

Figure 7:
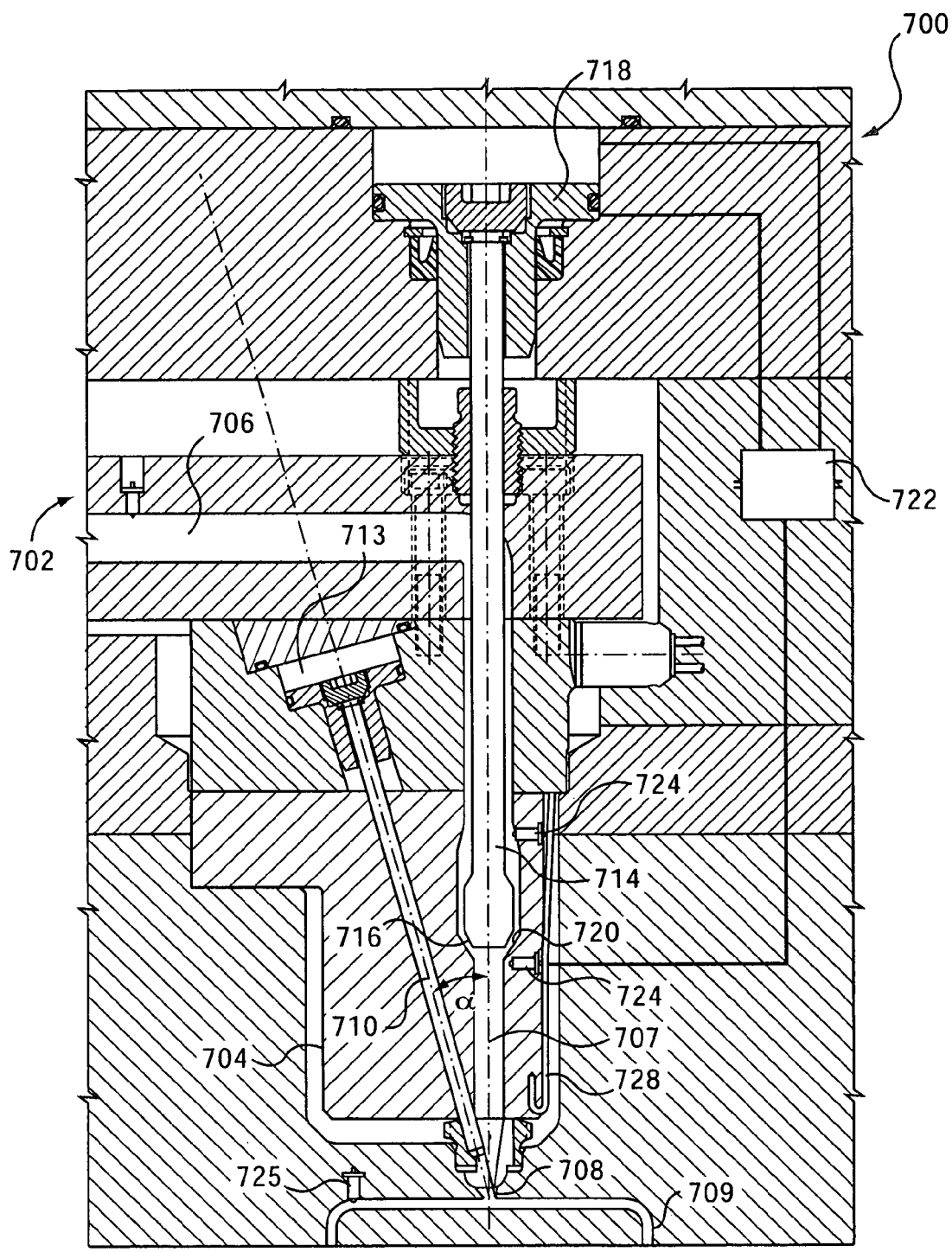
FIG. 7 shows a sectional schematic view of an injection molding system according to a third embodiment of the present invention, where the flow is constrained and the mold gate orifice is open.
Figure 8:
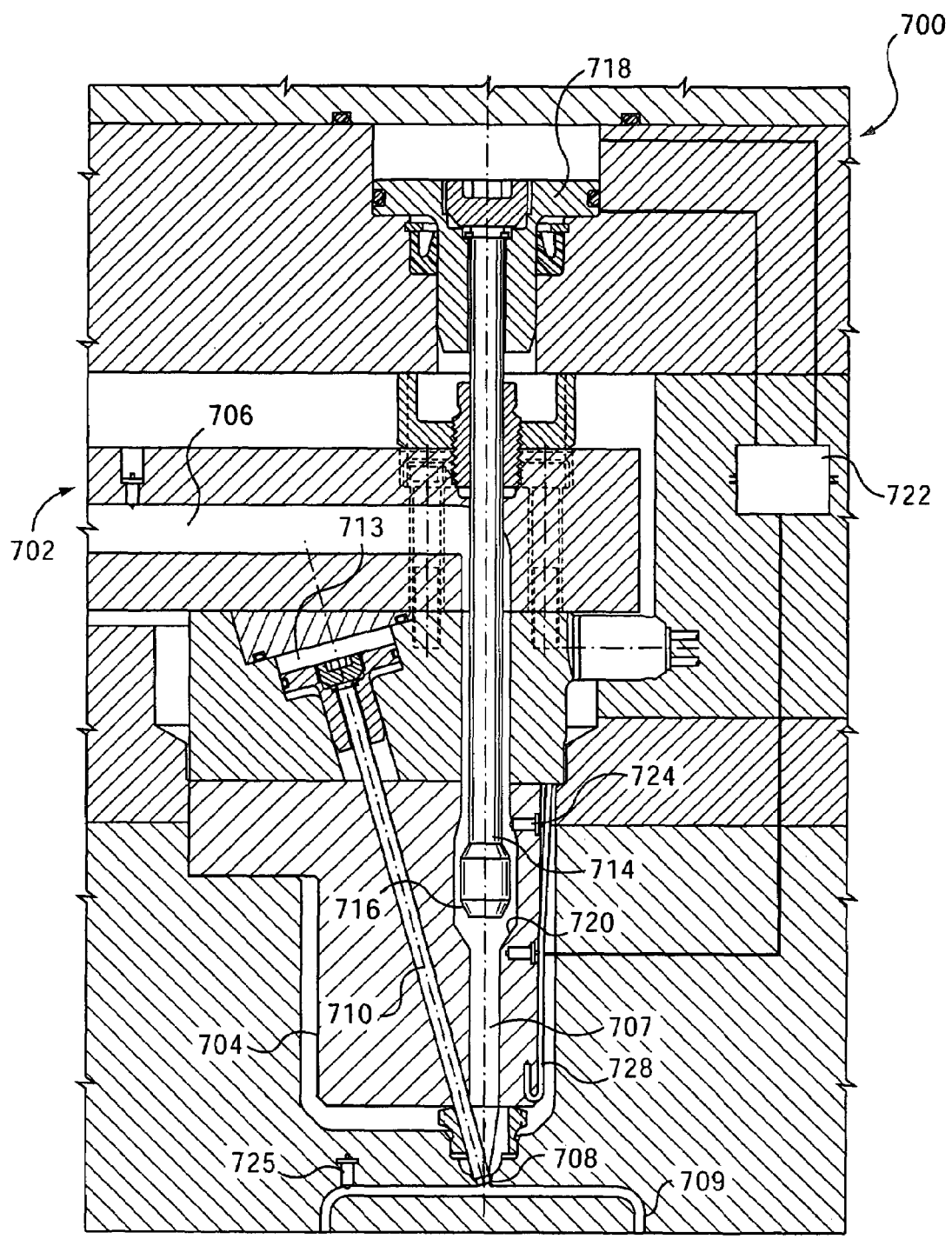
FIG. 8 shows a sectional schematic view of an injection molding system according to the third embodiment of the present invention, where the flow is not constrained and the mold gate orifice is closed.

FIGS. 7 and 8 show another embodiment of the present invention, depicting another possible arrangement of a valve pin 710 and an independently actuated flow control pin 714 within an injection molding system 700. In this embodiment, valve pin 710 is laterally offset with respect to actuated flow control pin 714 and at an angle α therewith. FIG. 7 shows valve pin 710 in a first position, unseated from gate 708 to allow melt to flow through gate 708 into mold cavity 709. FIG. 8 shows valve pin 710 seated within gate 708 to prevent the flow of melt into mold cavity 709. System 700 functions similarly as described above with respect to the first and second embodiments, for example utilizing transducers 724 and 725, a servo valve 722, and a thermocouple 728.

Figure 9:
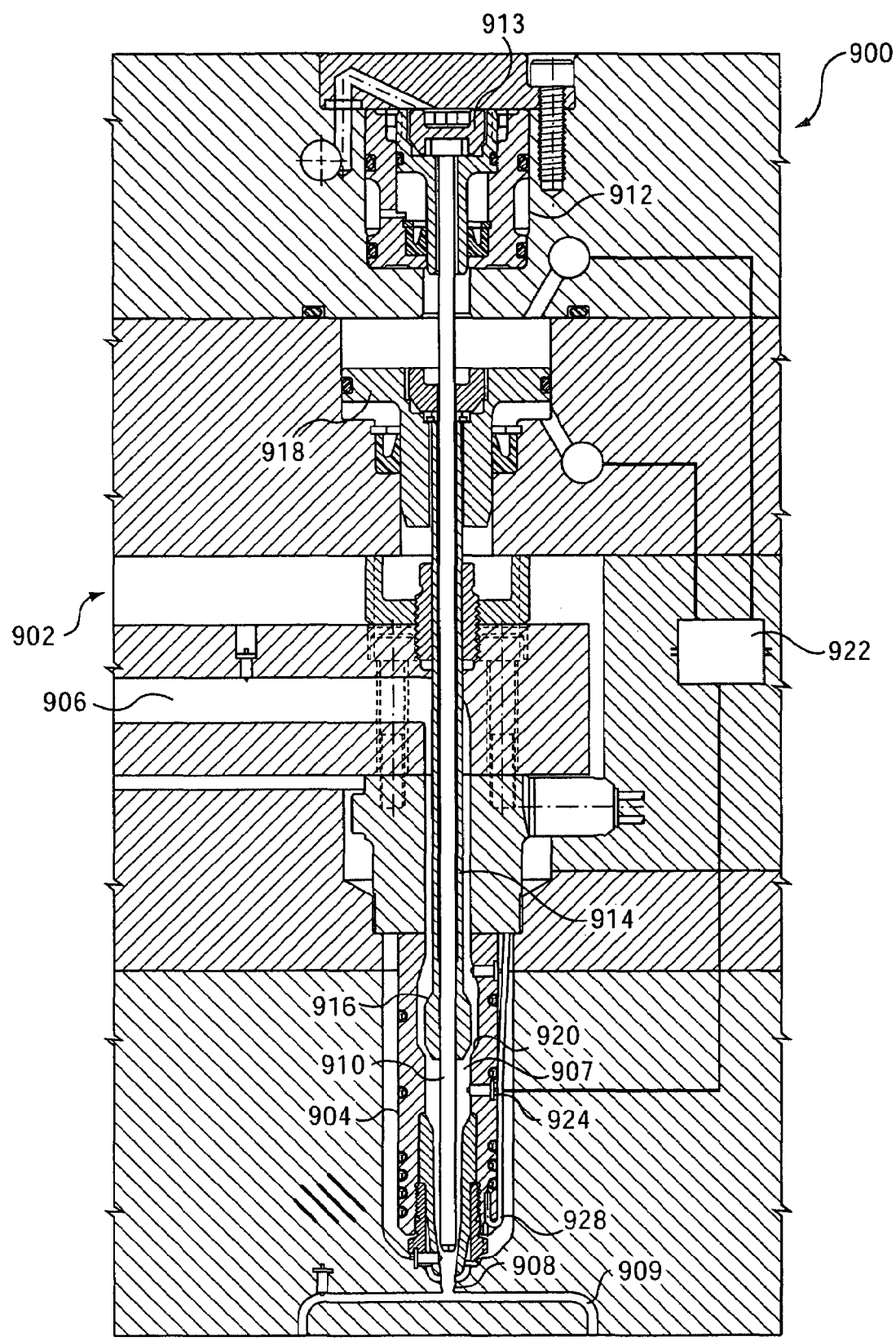
FIG. 9 shows a sectional schematic view of an injection molding system according to a fourth embodiment of the present invention, where the flow is constrained and the mold gate orifice is open.
Figure 10:
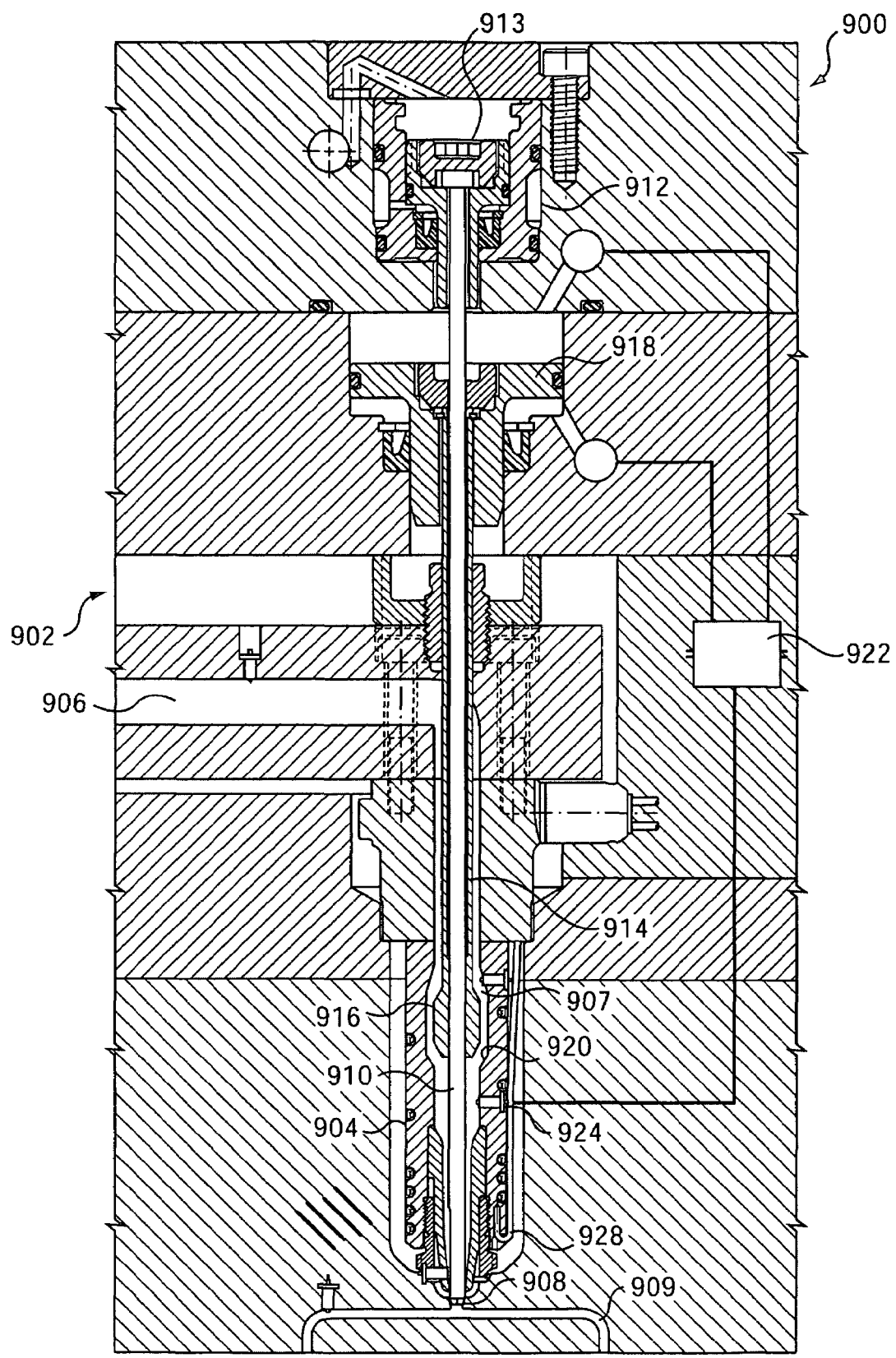
FIG. 10 shows a sectional schematic view of the injection molding system according to the fourth embodiment of the present invention, where the flow is not constrained and the mold gate orifice is closed.

FIGS. 9 and 10 show another embodiment of the present invention, depicting another possible arrangement of a valve pin 910 and an independently actuated flow control pin 914 within an injection molding system 900. Valve pin 910 and independently actuated flow control pin 914 are positioned in the same configuration as shown in FIG. 1, except that the servo valve (922) for controlling valve pin 910 has been eliminated. FIG. 9 shows valve pin 910 in a first position, unseated from gate 908 by operation of valve pin actuation mechanism 912 to allow melt to flow through gate 908 into mold cavity 909. FIG. 10 shows valve pin 910 seated within gate 908 by operation of valve pin actuation mechanism 912 to prevent the flow of melt into mold cavity 909.

System 900 functions similarly as described above with respect to the first and second embodiments, for example utilizing a transducer 924, a servo valve 922, and a thermocouple 928, except that valve pin actuation mechanism 912 is controlled by a method other than a servo valve. As previously mentioned, valve pin actuation mechanism 912 may be controlled by a computer that follows a pre-determined cycle. The computer would signal circuitry connected to the driving mechanism according to the cycle, and the circuitry would trigger the driving mechanism, and piston 913 would be driven up or down. Alternatively, valve pin actuation mechanism 912 may be controlled by an operator who manually triggers the driving mechanism.

Figure 11A:
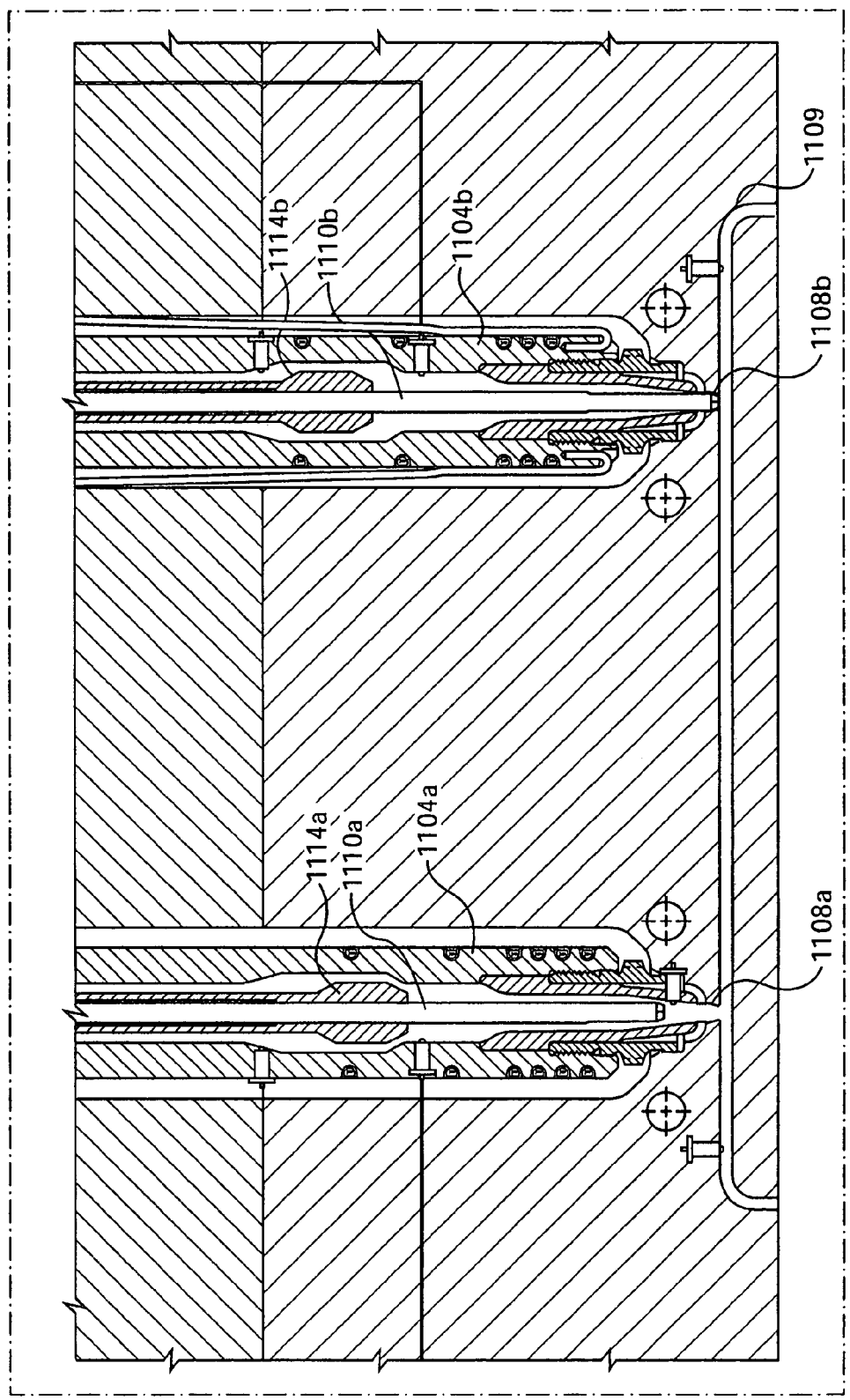
FIG. 11A shows an enlarged view of the nozzles of the injection molding system according to the first embodiment of the present invention in a first application, where the nozzles are in a first configuration.

FIGS. 11A and 11B show an application of the present invention wherein multiple nozzles 1104a and 1104b are feeding one large mold cavity 1109. Valve pins 1110a and 1110b and independently actuated flow control pins 1114a and 1114b are positioned in the same configuration as shown in FIG. 1, and function similarly as described above with respect to the first and second embodiments. In this embodiment of the present invention, the positions of valve pins 1110a and 1110b and flow control pins 1114a and 1114b are controlled in such as manner to produce an acceptable knit line where the melt from each nozzle 1104a and 1104b meets within mold cavity 1109. FIG. 11A shows valve pin 1110a unseated from gate 1108a to allow melt to flow through gate 1108a into mold cavity 1109, while valve pin 1110b is seated within gate 1108b to prevent flow of melt into mold cavity 1109. In FIG. 11B, valve pin 1110a is seated within gate 1108a to prevent the flow of melt into mold cavity 1109, while valve pin 1110b is unseated from gate 1108b to allow melt to flow through gate 1108b into mold cavity 1109. It would be understood to one of ordinary skill in the art that each valve pin and flow control pin are independently actuated to controllably regulate the flow of the melt to achieve optimal molding conditions within the mold cavity and thereby produce an improved molded part.

Figure 12A:
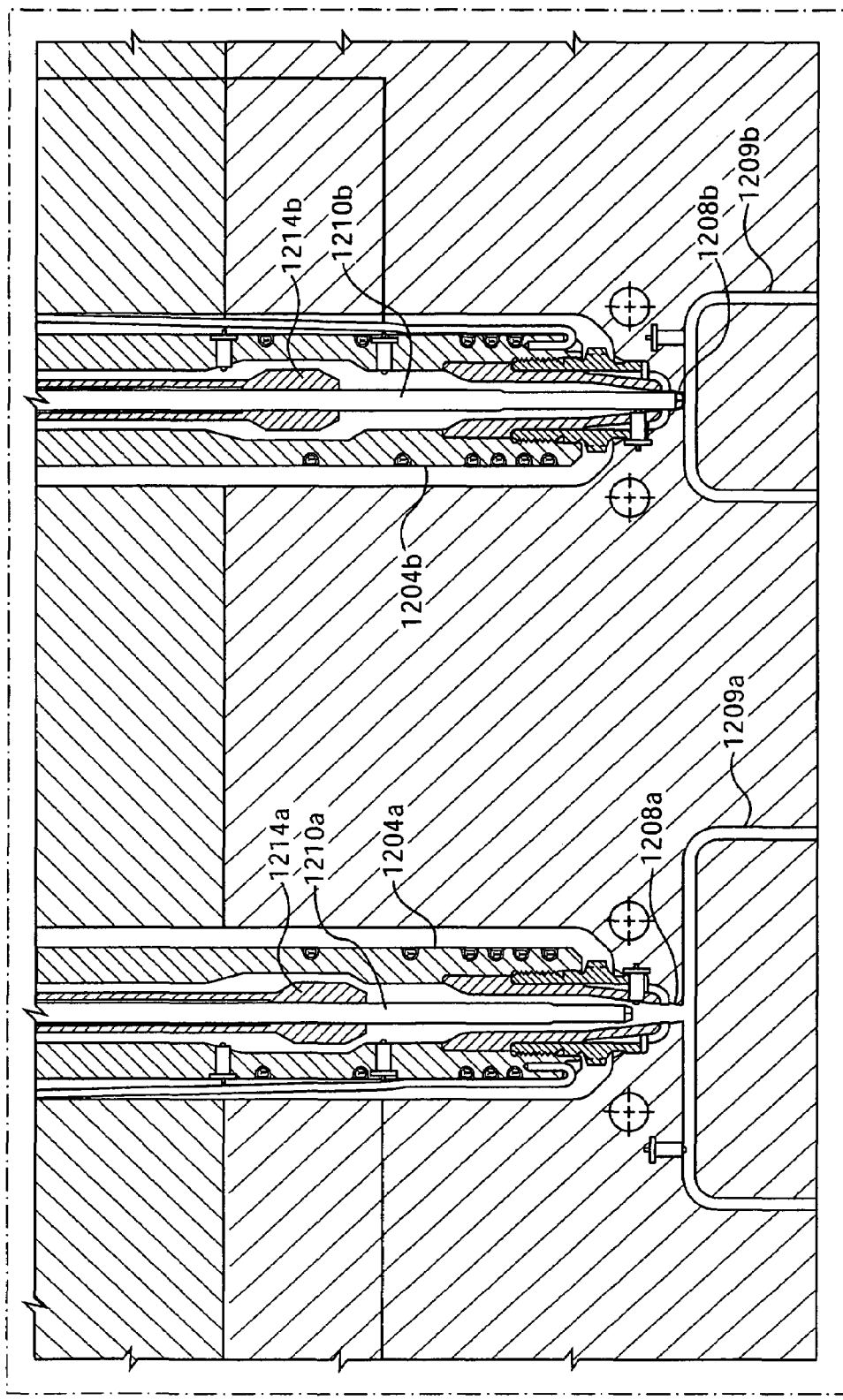
FIG. 12A shows an enlarged view of the nozzles of the injection molding system according to the first embodiment of the present invention in a second application, where the nozzles are in a first configuration.
Figure 12B:
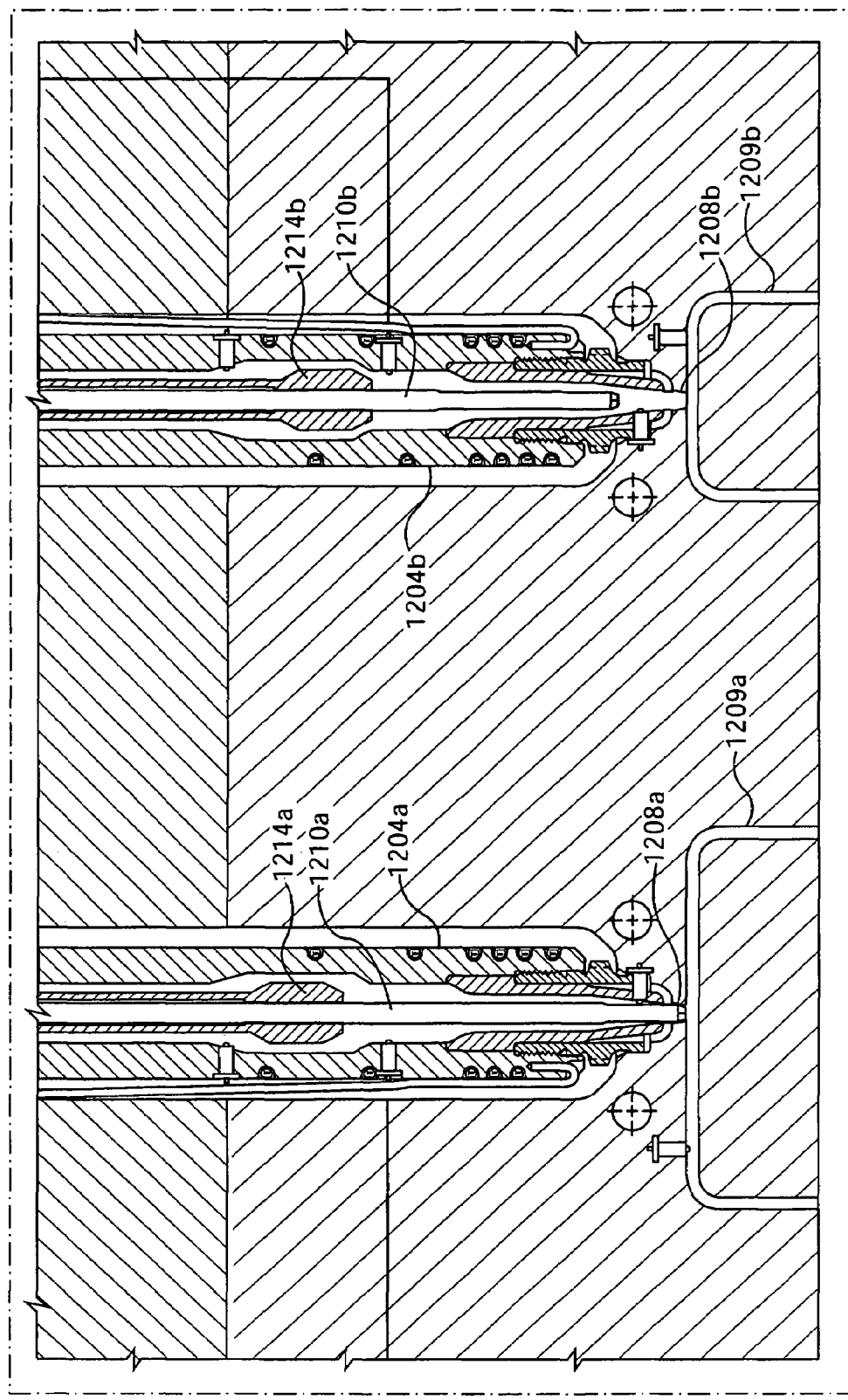
FIG. 12B shows an enlarged view of the nozzles of the injection molding system according to the first embodiment of the present invention in a second application, where the nozzles are in a second configuration.

FIGS. 12A and 12B show another application of the present invention wherein a first nozzle 1204a is feeding a first mold cavity 1209a and a second nozzle 1204b is simultaneously feeding a second cavity 1209b of a different size than first cavity 1209a. Valve pins 1210a and 1210b and independently actuated flow control pins 1214a and 1214b are positioned in the same configuration as shown in FIG. 1, and function similarly as described above with respect to the first and second embodiments. Multiple cavities of different sizes may be filled in the same cycle or time period due to the flow control provided by valve pins 1210a and 1210b and flow control pins 1214a and 1214b. Each of the valve and flow control pins are independently actuatable to provide balancing of the melt flow from manifold 102 through each respective nozzle and into the respective mold cavities.

FIG. 12A shows valve pin 1210a unseated from gate 1208a to allow melt to flow through gate 1208a into first cavity 1209a, while valve pin 1210b is seated within gate 1208b to prevent flow of melt into second cavity 1209b. In FIG. 12B, valve pin 1210a is seated within gate 1208a to prevent the flow of melt into first cavity 1209a, while valve pin 1210b is unseated from gate 1208b to allow melt to flow through gate 1208b into second cavity 1209b.

While in FIGS. 11A, 11B, 12A, and 12B, one valve pin is shown seated and the other valve pin is shown unseated, it should be understood that both valve pins may simultaneously be seated or unseated dependent on the molding conditions, and that each valve pin is actuatable to control flow of melt from the nozzle channel to the mold cavity at various intermediate positions.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An injection molding system comprising:
   a manifold having a plurality of manifold melt channels for conveying a melt stream;
   a plurality of nozzles, wherein each nozzle has a nozzle melt channel fluidly connected to a respective manifold melt channel and an actuated valve pin having a terminal end disposed within a portion of said nozzle melt channel proximate to a mold gate and slidably positionable for controlling the flow of the melt stream into a mold cavity via the mold gate; and
   an actuated flow control pin having a flow control surface disposed upstream of the terminal end of said actuated valve pin that is slidably positionable for controlling the flow rate of the melt stream towards the mold gate, wherein said valve pin and said flow control pin are independently actuated.

2. The injection molding system of claim 1, wherein the actuated flow control pin is disposed within the nozzle melt channel.

3. The injection molding system of claim 1, wherein the actuated flow control pin is disposed within the manifold melt channel.

4. The injection molding system of claim 1, wherein each nozzle is in fluid communication with a separate mold cavity.

5. The injection molding system of claim 4, wherein each mold cavity is of substantially equal size.

6. The injection molding system of claim 4, wherein at least one mold cavity is of a different size.

7. The injection molding system of claim 1, wherein at least two nozzles are in fluid communication with a single mold cavity.

8. The injection molding system of claim 1, wherein said actuated valve pin and said actuated flow control pin are actuated based on injection pressure information received from at least one pressure sensor.

9. The injection molding system of claim 8, wherein said at least one pressure sensor is in communication with said nozzle melt channel.

10. The injection molding system of claim 8, wherein said at least one pressure sensor is in communication with said mold cavity.

11. The injection molding system of claim 1, wherein said flow control pin has a shaft portion and a terminal end, wherein said terminal end has a larger outer diameter than said shaft portion and includes said flow control surface.

12. The injection molding system of claim 1, wherein at least one of said actuated valve pin and said actuated flow control pin are actuated based on temperature information received from at least one temperature sensor.

13. An injection molding apparatus comprising:
   a manifold having a manifold melt channel;
   a nozzle having a nozzle melt channel;
   a mold cavity having a mold gate to receive a molten material from said nozzle melt channel;
   a first actuated valve pin to control the flow of said molten material, said first actuated valve pin having a flow control surface configured to constrict the flow of said molten material; and
   a second actuated valve pin to further control the flow of said molten material from said nozzle melt channel into said mold cavity via said mold gate, wherein said first actuated valve pin and said second actuated valve pin are independently movable.

14. The injection molding apparatus of claim 13, wherein said first actuated valve pin and said second actuated valve pin each have a downstream end located at least partially within said nozzle melt channel.

15. The injection molding apparatus of claim 13, wherein said first actuated valve pin has a downstream end that is movable in said manifold melt channel and said second actuated valve pin has a downstream end that is movable in said nozzle melt channel.

16. The injection molding apparatus of claim 13, wherein said first actuated valve pin and said second actuated valve pin are actuated based on injection pressure information received from at least one pressure sensor.

17. The injection molding apparatus of claim 16, wherein said at least one pressure sensor is in communication with said nozzle melt channel.

18. The injection molding apparatus of claim 16, wherein said at least one pressure sensor is located in said mold cavity.

19. The injection molding apparatus of claim 13, wherein said second actuated valve pin is actuated along said nozzle melt channel.

20. The injection molding apparatus according to claim 13, wherein said first actuated valve pin and said second actuated valve pin are movable along a common axis.

21. The injection molding apparatus of claim 13, wherein said first actuated valve pin has a shaft portion and a terminal end, wherein said terminal end has a larger outer diameter than said shaft portion and includes said flow control surface.

22. The injection molding apparatus of claim 13, wherein said flow control surface of said first actuated valve pin constricts the flow of said molten material when positioned within a portion of said nozzle melt channel having a complementary shape to that of said flow control surface.

23. The injection molding apparatus of claim 15, wherein said flow control surface is on the downstream end of said first actuated valve pin to constrict the flow of said molten material when positioned within a portion of said manifold melt channel having a complementary shape to that of said flow control surface.

24. The injection molding apparatus of claim 13, wherein said second actuated valve pin is actuated laterally with respect to said first actuated valve pin.

* * * * *